(No Model.)
W. GURLEY.
TELESCOPIC HAND LEVEL.
No. 353,406. Patented Nov. 30, 1886.
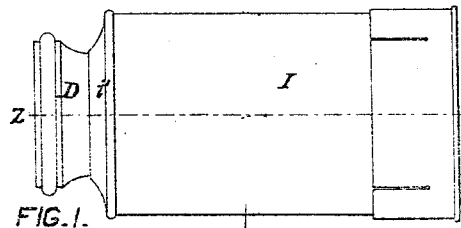
FIG. 1.
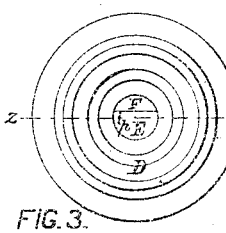
FIG. 3.
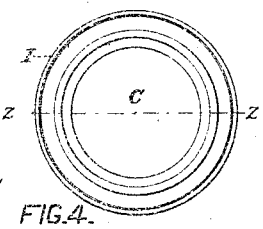
FIG. 4.
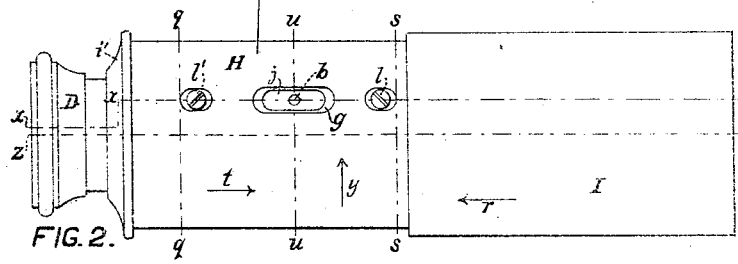
FIG. 2.
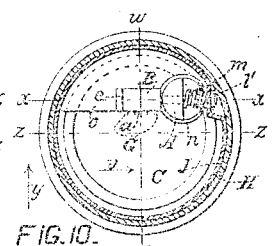
FIG. 10.
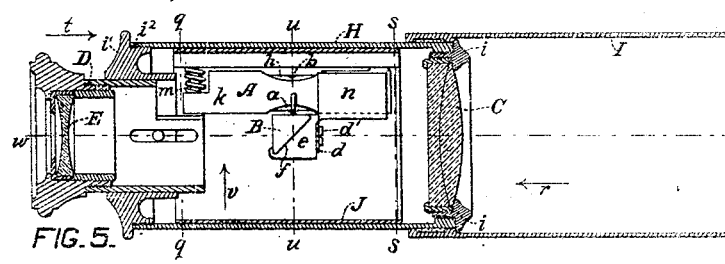
FIG. 5.
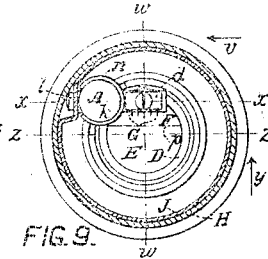
FIG. 9.
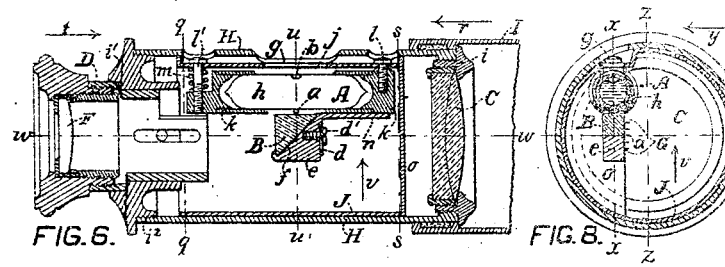
FIG. 6.
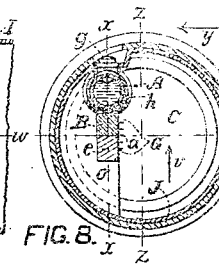
FIG. 8.
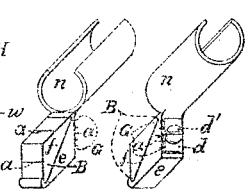
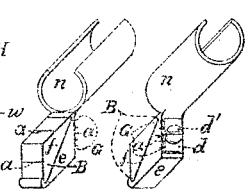
FIG. 13. FIG. 14.
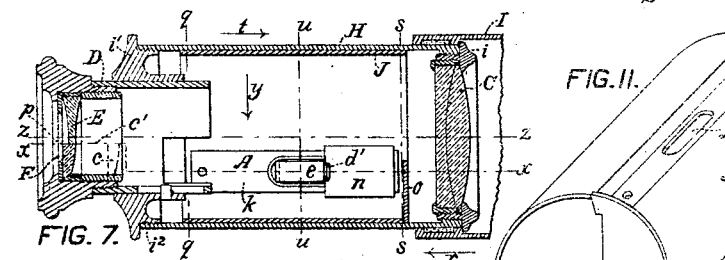
FIG. 7.
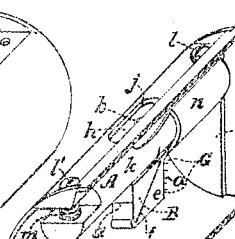
FIG. 11. FIG. 12.
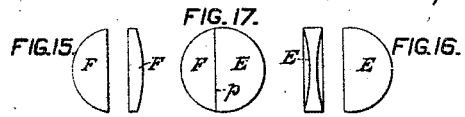
FIG. 15. FIG. 17. FIG. 16.
WITNESSES:
John C. House
Edward P. Searle
INVENTOR:
William Gurley

UNITED STATES PATENT OFFICE.

WILLIAM GURLEY, OF TROY, NEW YORK, ASSIGNOR TO W. & L. E. GURLEY, OF SAME PLACE.

TELESCOPIC HAND-LEVEL.

SPECIFICATION forming part of Letters Patent No. 353,406, dated November 30, 1886.

Application filed July 10, 1886. Serial No. 207,639. (No model.)

*To all whom it may concern:*

Be it known that I, WILLIAM GURLEY, a citizen of the United States, residing in the city of Troy, in the county of Rensselaer and State of New York, have invented certain new and useful Improvements in Telescopic Hand-Levels, of which the following is a specification, reference being had to the accompanying drawings.

The general object of this invention is to produce a very short, compact, cheap, durable, efficient, easily adjustable, and well-incased telescopic leveling-instrument, having a very large and clear field, and requiring but one eye to be used by an engineer or surveyor in quickly taking preliminary or approximate levels with the instrument held by hand.

In the aforesaid drawings, Figure 1 is a side elevation of one of my improved telescopic leveling-instruments or hand-levels closed up short with a cap on its object end ready to be safely and conveniently carried in a surveyor's or engineer's pocket. Fig. 2 is a plan of the same instrument ready for use with the cap removed and the outer slide drawn out from over the spirit-level and beyond the object-glass. Fig. 3 is an elevation of the eye end, and Fig. 4 an elevation of the object end, of the instrument, as shown by Fig. 2. Fig. 5 represents a longitudinal section of the same instrument in the plane of the lines *z z* in Figs. 2, 3, 4, 7, 8, 9, 10, and an elevation of some parts viewed in the direction of the arrow *y* in those figures. Fig. 6 shows a partial longitudinal section of the same instrument at about the plane of the lines *x x* in Figs. 2, 7, 8, 9, 10, and an elevation of some parts seen in the direction of the arrows *y*. Fig. 7 presents a partial longitudinal section of the same instrument at about the plane of the lines *w w* in Figs. 5, 6, 8, 9, 10, and elevation of some parts viewed in the direction of the arrows *v* in those figures. Fig. 8 is a transverse section at about the line *u u* in Figs. 2, 5, 6, 7, and elevation of some parts, as viewed in the direction of the arrow *t*. Fig. 9 shows a transverse section at about the line *s s* in Figs. 2, 5, 6, and 7, and elevation of some parts seen in the direction pointed by the arrow *r*. Fig. 10 represents a partial transverse section at the line *q q* in Figs. 2 and 7, and an elevation of some parts viewed in the direction of the arrow *t*. Fig. 11 is an isometrical representation of a slide to which the spirit-level is shown secured in Figs. 5, 6, 7, 8, 9, and 10, and Fig. 12 is an isometrical drawing of a portion of the same slide with the spirit-level secured thereto. Figs. 13 and 14 are isometrical views of the reflector and the part by which it is shown secured to the spirit-level in Figs. 5, 6, 7, 8, 9, 10, and 12. Fig. 15 presents side and inner edge views of the segmental convex lens; Fig. 16, side and inner edge elevations of the segmental concave lens; and Fig. 17, a side view of the two segmental convex and concave lenses in contact, edge to edge, as they are in the eye-piece of the instrument represented by Fig. 7 and other figures.

One distinguishing feature of this invention is a telescopic leveling-instrument embracing a spirit-level, A, furnished with a cross-wire, mark, line, or index, *a*, and with a diagonal or inclined reflector, D, opposite to the middle exposed part of the spirit-level, a convex object-glass, C, and an eye-piece, D, having segmental lenses shaped and arranged together so that a person holding the instrument by hand can by one eye see the spirit-level index or its image, and the image of the bubble *b* of the spirit-level through one segmental lens part of the eye-piece, and can simultaneously see by the same eye, through the other segmental lens part of the eye-piece and the object-glass, a distant object magnified and in apparent coincidence with the index and bubble of the spirit-level.

In carrying out that feature of my invention the eye-piece may have in its two lateral side parts, and contiguous to each other, two sets or rows, each of one, two, or more segmental lenses, of any suitable sectional shapes, as in the eye-pieces of various common telescopes, microscopes, or magnifying-glasses, one set or row of the segmental lenses being directed toward the reflector, and adapted to show to the eye the index or its image and the image of the bubble of the spirit-level, and the other set or row of segmental lenses being directed toward the object-glass, and adapted to simultaneously show through the latter to the same eye a distant object magnified and apparently contiguous or adjacent to or in line with the spirit-level index or its image.

To see the largest field, and secure therefrom the most light to the eye through the object-glass and eye-piece, and to greatly shorten the instrument and lessen its cost, I have in its eye-piece D a suitable segmental concave lens, E, Figs. 5, 7, and 16, opposite to and directed toward that side portion of the object-glass C which is directly opposite to the reflector B, and also have in the eye-piece a segmental convex lens, F, Figs. 7 and 15, opposite to the reflector, so that one eye of a person can see a distant object magnified through the object-glass and the concave lens E, and can simultaneously see through the convex lens F the magnified index or its image, and the image of the bubble b of the spirit-level in apparent coincidence with the distant object.

I prefer to have the segmental convex lens F in about the same plane as and in contact with the segmental concave lens E, as shown in Fig. 7; but the convex lens may be at any suitable distance forward of the concave lens, as indicated in that figure by dotted lines at c, in which case a plain glass may be secured edge to edge with the concave lens to exclude dust, or a thin partition may extend from the section edge of the concave lens to or past the section edge of the advanced convex lens, as indicated in Fig. 7 by the dotted line c'.

To provide the instrument with means for ascertaining the distance from the instrument to a distant graduated rod, I furnish the instrument with two or more stadia-wires, marks, or points, as G, which can be seen through the convex lens F, in apparent coincidence with graduations or targets on a distant rod, seen through the telescope; and which wires, marks, or points are adjusted just so far apart that they will include a certain space on the rod at a given distance from the instrument—as, for instance, one foot on a rod one hundred feet distant, two feet on a rod two hundred feet away, or half a foot on a rod fifty feet distant. The stadia-wires, marks, or points, can be made or secured in any suitable manner at any suitable part of the instrument within the focus of the lens F, which should be of low magnifying power.

In the drawings the points G are shown projecting from a small plate, d, which is adjustably secured to the holder e of the reflector by a headed screw, d'. The reflector B can be a glass prism having a right angle, as shown, or a mirror inclined at an angle of forty-five degrees to the plane of the spirit-level, as indicated by the line f in Figs. 5 and 6.

To avoid having the spirit-level exposed outside of the tube or case of the telescope, and to have the spirit-level inclosed within and protected by that case or tube, I locate and secure the spirit-level A wholly within and at one side of the telescope-case H, and have through that case or tube a light or sight aperture, g, Figs. 2, 6, 8, opposite to the middle portion of the spirit-level, which has the middle part of its glass tube h, Figs. 5 and 6, exposed at top and bottom opposite to the reflector.

To provide means for temporarily covering the aperture g in the case, and thereby further protecting the glass of the spirit-level and preventing dust from entering through that aperture when the instrument is being carried in a surveyor's pocket, and for temporarily uncovering said aperture and simultaneously shading the object-glass, and lengthening the instrument for more accurate holding and sighting, I furnish the tube or case H of the instrument with a slide, I, which is movable to and fro lengthwise on the case, and is of such length and so located that when it is in one position it covers the aperture g, and leaves the instrument short in length, as shown in Fig. 1, and that when the slide I is in another position it leaves the aperture g uncovered, and extends forward beyond and shades the object-glass C, about as illustrated by Figs. 2, 5, and 6.

In the drawings the object-glass C is shown removably secured to one end of the tube H by a screw-coupling, i, and the eye-piece is shown fitted to be slid to and fro lengthwise in a suitable socket in a part, i', which is secured by a screw-coupling, $i^2$, to the other end of the tube, as I commonly prefer, so that the telescope can be thereby adjusted for viewing objects at greatly different distances; but for a like purpose the object-glass can be secured to a tube movable to and fro lengthwise in the case H, as in the telescopes of common leveling-instruments, the eye-piece being either fixed or movable to and fro lengthwise.

As regards the above-described features of my invention, the spirit-level, with its index and reflector, can be secured by any suitable known devices to and within the case of the telescope. I, however, provide means for mounting the spirit-level, with its index and reflector, within the case in such manner that they can be all together quickly introduced within and withdrawn from the case when one end of it is suitably open, and can be quickly adjusted lengthwise within the case, so as to bring the spirit-level, index, and reflector into position to be clearly seen through the segmental lens F, or its equivalent, when the telescope is adjusted so that objects at usual distances of sight can be clearly seen through it. For that purpose I secure the spirit-level, with its index and reflector, by any suitable known devices, to or within a suitable slide or tube, as J, which is of such size and shape that it can be introduced into and removed from the case H through one suitably-opened end thereof, and will fit closely and be movable tightly, and thereby adjustable to and fro lengthwise in the case, and which slide has a side opening, j, Figs. 6, 11, 12, opposite to the exposed part of the glass tube h of the spirit-level. I also commonly have the slide J fit the case H, so as to be somewhat movable, and thereby adjustable circumferentially in the case, or so that the part J can be slid into somewhat different positions in the case to thereby bring the opening $j$ properly opposite to the aperture $g$, or to adjust the spirit-level and its attached index $a$ and reflector B in a plane about parallel to the division-line $p$, Figs. 9 and 17, between the segmental lenses of the eye-piece; but the latter object may be attained by having the eye-piece movable and adjustable circumferentially.

In the instrument represented by the drawings the spirit-level is adjustably secured to the slide J by having one end part of the level-case $k$, Fig. 6, fit against the slide and secured thereto by a headed screw, $l$, and the other end part of the level-case secured to the slide by an intervening expanding-spring, $m$, and a headed screw, $l'$, Figs. 6 and 10. By this means the spirit-level can be so adjusted in the instrument that when the reflector B is properly set or adjusted in respect to the spirit-level and index $a$ the line of sight through and from the lens F to the index $a$ or its image presented by the reflector B will be horizontal whenever the index or its image and the image of the level-bubble $b$ are seen coinciding with each other through said lens. Such adjustment can be made by sighting through the telescope at a distant point known to be in the same horizontal line with the instrument, and properly turning the screw $l'$ or screws $l'$ and $l$ until the index or its image and the image of the spirit-level bubble, seen through the lens F, simultaneously appear horizontally opposite to said distant point seen through the telescope.

In carrying out my invention the index $a$ of the spirit-level may be at various points where it or its reflected image can be clearly seen through the lens F, as at $a$, on the reflector B or on its holder $c$, or on the under or the upper side of the exposed middle part of the glass of the spirit-level. Also the segmental convex lens F can be either plano-convex, as shown, or double convex or suitably concavo-convex, and the segmental concave lens E can be either suitably plano-concave or double concave, as shown.

To provide means for quickly securing the reflector upon and removing it from the case of the spirit-level, for adjusting the reflector circumferentially on the level-case to bring the reflector into the proper plane in respect to the level and to the junction-line $p$ between the segmental lenses of the eye-piece, or for adjusting the reflector into proper position lengthwise in respect to the exposed middle portion of the spirit-level, its index, and the focus of the segmental lens F, the holder of the reflector is furnished with a split or slotted tube or spring-socket, $n$, Figs. 13 and 14, which is adapted to fit tightly upon the cylindrical part of the case $k$ of the spirit-level and to be slid on and off from one end portion thereof, and to be moved to and fro, and thereby adjusted circumferentially or lengthwise, or lengthwise and circumferentially, upon the case of the spirit-level.

In Figs. 7, 8, 10, 11, and 12, $o$ is a segmental diaphragm to cut off light from directly in front of that side part of the instrument in which the spirit-level and reflector are mounted.

I claim as my invention—

1. A telescopic leveling-instrument embracing a spirit-level furnished with an index and a diagonal or inclined reflector, an object-glass, and an eye-piece having two segmental lens portions combined, so that one eye can see through one segmental lens portion of the eye-piece the index or its reflected image and the reflected image of the bubble of the spirit-level, and in apparent coincidence therewith can simultaneously see a distant object magnified through the object-glass and the other segmental lens portion of the eye-piece, substantially as set forth.

2. A telescopic leveling-instrument embracing a spirit-level furnished with an index and an inclined reflector, an object-glass, and an eye-piece having segmental convex and concave lenses, so combined that one eye can see through the segmental convex lens the index or its reflected image and the reflected image of the bubble of the spirit-level, and in apparent coincidence therewith can simultaneously see a distant object magnified through the object-glass and the segmental concave lens of the eye-piece, substantially as set forth.

3. A telescopic leveling-instrument embracing a spirit-level furnished with an index, inclined reflector, and stadia lines or points, an object-glass, and an eye-piece having two segmental lens portions so combined that one eye can see through one segmental lens portion of the eye-piece the index or its reflected image, the reflected image of the bubble of the spirit-level, and the stadia lines or points, and in apparent coincidence therewith can simultaneously see a distant object magnified through the object-glass and the other segmental lens portion of the eye-piece, substantially as set forth.

4. A telescopic leveling-instrument embracing a tube having a lateral aperture, an object-glass in one end of the tube, an eye-piece in its other end, and a spirit-level wholly within the tube at one side thereof, and having the middle part only of the spirit-level opposite to and visible through said lateral aperture in the tube, substantially as set forth.

5. A leveling-instrument embracing a telescope having a tube with an object-glass in one end, an eye piece in the other end, and an aperture in one side, a spirit-level within the tube, at one side thereof, and opposite to and visible through the side aperture in the tube, and a slide movable to and fro lengthwise on said tube, and in one position covering said aperture, and in another position exposing said aperture, and extending beyond and shading the object-glass, substantially as set forth.

6. A telescopic leveling-instrument embracing a case having a lateral aperture, a spirit-level within the case, at one side thereof, opposite and adjacent to said lateral aperture, and furnished with an index and an inclined reflector, an object-glass at one end of said case, and at its other end an eye-piece having a segmental convex lens directed toward said reflector, and a segmental concave lens directed toward the object-glass, substantially as set forth.

7. A telescopic leveling-instrument embracing a case having a lateral aperture, a spirit-level within the case, at one side thereof, opposite to said aperture, and furnished with an index, inclined reflector, and stadia-points, an object-glass at one end of the case, and at its other end an eye-piece having a segmental convex lens directed toward the reflector and stadia-points and a segmental concave lens directed toward the object-glass, substantially as set forth.

8. A telescopic leveling-instrument embracing a case having a lateral aperture, a spirit-level within the case, at one side thereof, opposite to said lateral aperture, and furnished with an index and an inclined reflector, an object-glass at one end of the case, at its other end an eye-piece having a segmental convex lens directed toward said reflector, and a segmental concave lens directed toward said object-glass, and a slide movable to and fro lengthwise on the case, and in one position covering said lateral aperture, and in another position exposing the aperture and extending beyond and shading the object-glass, substantially as set forth.

9. In a telescopic leveling-instrument, a lateral aperture in the tubular case of the telescope, a removable slide adjustable to and fro lengthwise within said case, and a spirit-level adjustably secured to said slide and by the latter adjustable to and fro lengthwise within said case and in respect to said lateral aperture, substantially as set forth.

10. A telescopic leveling-instrument embracing a case having a lateral aperture therein, a slide adjustable to and fro lengthwise in the case, a spirit-level secured to said slide within the case opposite to said lateral aperture, and furnished with an index and an inclined reflector, an object-glass at one end of the case, and at its other end a sliding eye-piece having a segmental convex lens directed toward the reflector, and a segmental concave lens directed toward the object-glass, substantially as described.

11. In a telescopic leveling-instrument, a spirit-level having a case with top and bottom openings opposite to the middle part of the glass of the spirit-level, and an inclined reflector opposite to one of said openings and supported by a holder having a socket fitting and adjustable lengthwise upon said case, as set forth.

12. In a telescopic leveling-instrument, a spirit-level having a cylindrical case with top and bottom openings opposite to the middle part of the glass of the spirit-level, and an inclined reflector opposite to one of said openings and supported by a holder having a socket fitting and adjustable circumferentially upon said case, substantially as set forth.

13. In a telescopic leveling-instrument, a spirit-level having a case with top and bottom openings opposite to the middle part of the glass of the spirit-level, and an inclined or diagonal reflector opposite to one of said openings and supported by a holder having a socket fitting and adjustable lengthwise and circumferentially upon said case, substantially as described.

14. A telescopic leveling-instrument having a side aperture in the telescope-tube, a slide fitting and adjustable lengthwise within said tube, a spirit-level secured to said slide within said tube and opposite to the side aperture therein, and having a case with top and bottom openings opposite to the middle part of the glass of the spirit-level, and a diagonal or inclined reflector opposite to one of said openings and supported by a holder having a socket fitting and adjustable upon the case of the spirit-level, substantially as described.

In testimony whereof I hereunto set my hand, in the presence of two subscribing witnesses, this 7th day of July, 1886.

WILLIAM GURLEY.

Witnesses:
JOHN C. HOUSE,
EDWARD P. SEARLE.